Figure 1:
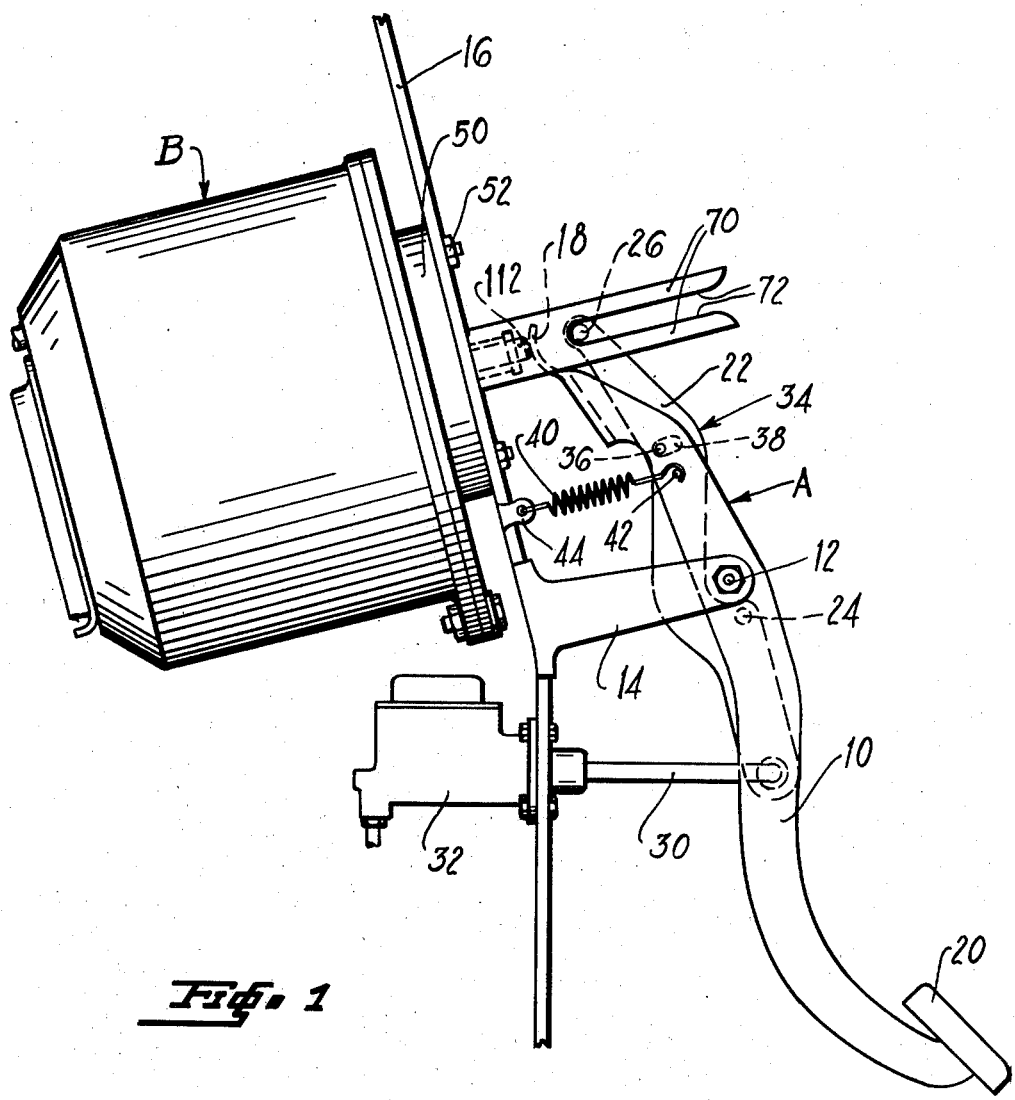

April 8, 1958 E. E. HUPP ET AL 2,829,625
PNEUMATIC SERVO-MOTOR CONSTRUCTION
Filed Jan. 17, 1956 2 Sheets-Sheet 1

INVENTORS
EDWARD E. HUPP
MAXWELL L. CRIPE
BY *William P. Hickey*
ATTORNEY

INVENTORS
EDWARD E. HUPP
MAXWELL L. CRIPE
BY William P. Hickey
ATTORNEY

United States Patent Office 2,829,625
Patented Apr. 8, 1958

2,829,625

PNEUMATIC SERVO-MOTOR CONSTRUCTION

Edward E. Hupp and Maxwell L. Cripe, South Bend, Ind., assignors to Bendix Aviation Corporation, South Bend, Ind., a corporation of Delaware Application January 17, 1956, Serial No. 559,556

14 Claims. (Cl. 121—41)

The present invention relates to fluid pressure servo-motors and their cooperating force transmitting and actuating levers, and more particularly to pneumatic fluid pressure servo-motors of a type which receives its actuation from and which delivers its reaction to leverage interconnecting a manually operated lever and the driven device.

Devices of the above mentioned type can be effectively utilized for the power actuation of the braking systems of automobiles and the like. These systems conventionally employ a brake pedal lever operably connected through a lost motion connection to other leverage which is directly connected to the master cylinder, or its equivalent, of the braking system of the vehicle. The clearance provided by the lost motion connection between portions of the leverage is conventionally used for the operation of the control valve of the servo-motor. During normal operation of the system, the servo-motor applies its force to the portion of the leverage connected to the master cylinder; and during failure of the servo-motor, the master cylinder is operated manually through the lost motion connection.

In systems of the above described type, it is desirable to provide no more lost motion than is absolutely necessary for satisfactory operation of the servo-motor. It is further desirable to have the servo-motor and linkage assembly absorb as little as possible of the manually applied force for the actuation of the assembly, and to deliver as much as possible of the manually applied force to the master cylinder of the automobile, both during normal operation and during failure of the servo-motor.

Accordingly, an object of the present invention is the provision of a new and improved fluid pressure servo-motor and linkage assembly comprising a fluid pressure servo-motor and its actuating and force transmitting linkages adapted to use a minimum of the force applied to the linkages for the movement of the linkages and the actuation of the servo-motor, and which assembly transmits substantially all of the manually applied force to the driven device, both during normal operation and during failure of the servo-motor.

Another object of the invention is the provision of a new and improved assembly of the above described type comprising a pneumatic servo-motor and linkage assembly requiring the provision of a minimum of lost motion for the satisfactory operation of the servo-motor, such that a minimum of hysteresis occurs between the powered positioning of the driven lever and the manual positioning of the control lever.

Another object of the invention is the provision of a new and improved assembly of the above described type constructed and arranged such that the moving parts of the servo-motor need not be moved, or "dragged," by the operator during manual operation of the driven device through the lost motion connection when failure of the servo-motor occurs.

Another object of the invention is the provision of a new and improved pneumatic servo-motor of the cylinder and piston type, comprising an internal piston provided with a projection extending through one end wall of the cylinder and connected to reaction linkage of the above described type by means of abutment surfaces or a lost motion connection which prevents relative radial movement between the linkages and the piston projection, whereby said pivotally supported linkages cause said piston to tilt relative to its cylinder when moved longitudinally of the cylinder, said servo-motor being provided with sealing means between said piston projection and the end wall of said cylinder which accommodates radial movement of the piston projection relative to said cylinder as caused by the tilting action, and means providing an effective seal between the piston and the cylinder which will accommodate the tilting action.

Another object of the invention is the provision of a new and improved pneumatic servo-motor comprising a housing having a movable wall, said movable wall having a valve chamber thereon extending in the direction of motion of the movable wall and the opposite ends of which are subject to substantially the same pressure, a pair of movable chamber walls, one on each end of said chamber closing off said chamber from said pressure, a valve seat dividing said chamber into first and second opposed chambers, a valve closure member adapted to abut said seat, said valve closure member having projections which operatively engage each of the movable chamber walls to transmit their opposing forces to the valve closure member, and means for conducting a predetermined pressure to one of said opposed chambers, whereby the forces acting on said valve closure member may be substantially balanced regardless of the pressure in the other of said opposed valve chambers.

A further object of the invention is the provision of a new and improved pneumatic servo-motor having substantially balanced valve structure as outlined in the above object, and which further includes a spring biasing said valve closure member into one of its open or closed positions and being sufficiently strong to overcome valve friction.

Figure 2:
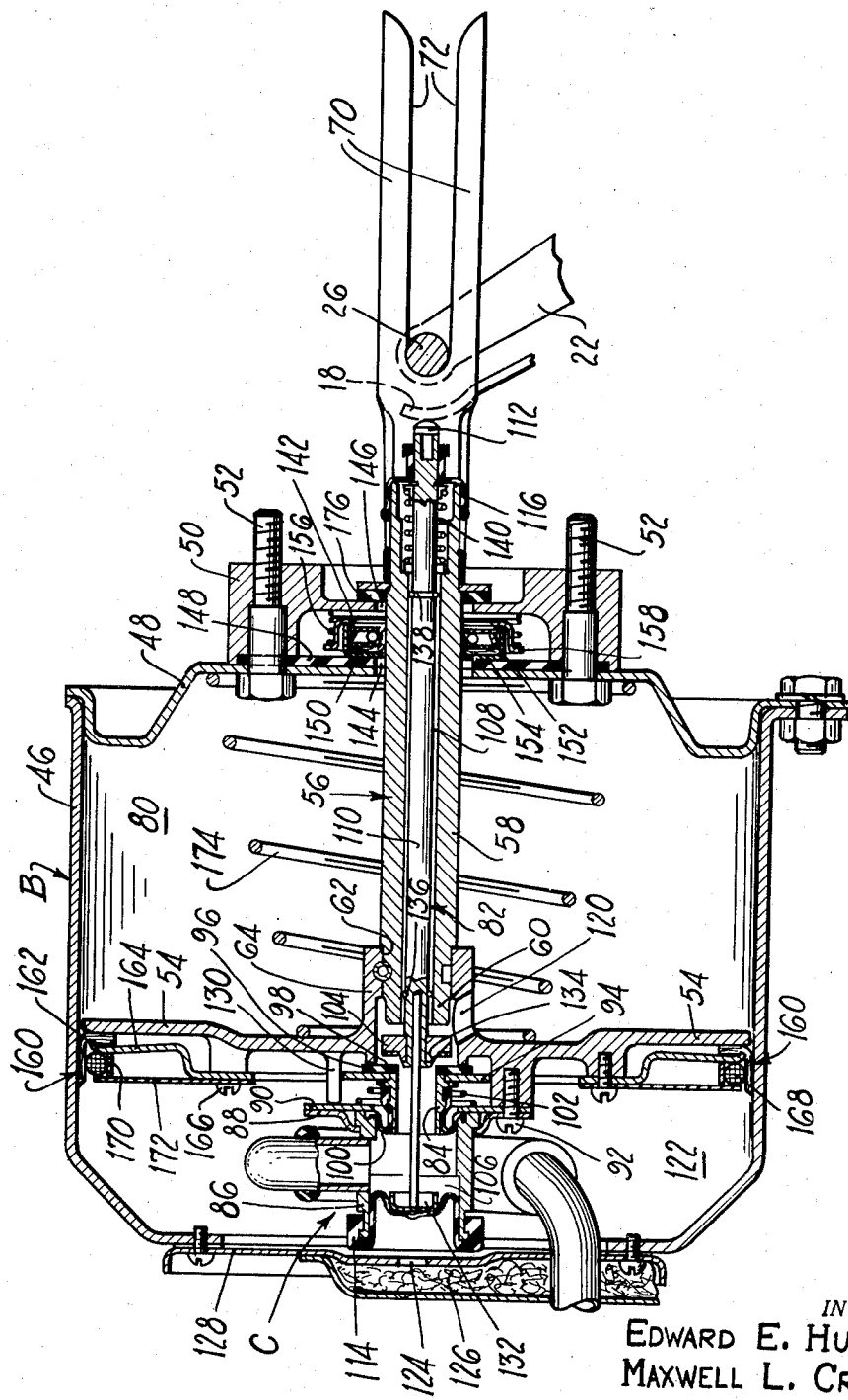

The invention resides in certain constructions, and combinations, and arrangement of parts, and further objects and advantages will be apparent to those skilled in the art from the following description of the preferred embodiment described with reference to the accompanying drawings forming a part of this specification, and in which:

Figure 1 is a side elevational view of a servo-motor and reaction linkage assembly embodying the principles of the present invention; and Figure 2 is a cross-sectional view of the servo-motor shown in Figure 1.

Referring to the drawings, there is shown therein a servo-motor and reaction linkage assembly of the general type previously described, and which in the present instance is adapted to operate the hydraulic braking system of an automobile. The reaction linkage shown in the drawing and indicated generally by the letter A comprises a manually operable lever or foot pedal 10 pivotally supported intermediate its ends by means of the bolt 12 and bracket 14 affixed to the firewall 16 of the automobile. The upper end of the foot pedal lever 10 is provided with an abutment portion or ramp 18 adapted to act as an abutment as will later be described, and the lower end of the foot pedal lever 10 is provided with a pedal structure 20 adapted to receive the foot of an operator. The reaction linkage A further includes a force delivering lever 22 pivotally connected at a point intermediate its ends to the foot pedal lever 10 as by a pin 24 spaced apart from the bolt 12. The upper end of the force delivering lever 22 is operatively connected by an abutment pin 26 to the piston rod 30 of the master cylinder 32 of the automobile. The foot pedal lever 10 and force delivering lever 22 are connected together by a lost motion connection indicated generally at 34 such that a limited amount of relative movement between the members will be permitted, upon depressing the pedal plate 20, before moving the force delivering lever 22. The lost motion connection 34 shown in the drawing comprises a pin 36 carried by the foot pedal lever 10 and which projects into a slot 38 of a predetermined length in the force delivering lever 22 to permit the pin 36 to travel a predetermined distance before engaging the end of the slot 38 to move the force delivering lever 22. The reaction linkage A is biased to its retracted or pedal-high position by a coil spring 40 one end of which is connected to the pedal lever 10 as by pin 42 and the other end of which is hooked into a bracket 44 attached to the firewall 16 of the automobile.

The reaction linkage A is adapted to be power actuated or driven by a servo-motor B which utilizes the relative movement between the levers 10 and 22 as provided by the lost motion connection 34 to actuate the control structure or valve of the servo-motor. The servo-motor B may be of any suitable type having a movable wall actuated by pneumatic pressure as, for example, a cylinder and piston arrangement, a diaphragm arrangement and/or a bellows arrangement; and may further be either of the pusher type adapted to push the reaction leverage away from the servo-motor or may be of the puller type adapted to pull the reaction leverage toward the servo-motor. It is well known that the movable walls of both diaphragm type motors and bellows type motors transfer some of the force applied across their movable walls to the side walls of the motor and that, therefore, these types of motors require larger diameter motor sizes in order to deliver a predetermined force than does a comparable piston and cylinder type motor. For this reason the servo-motor B of the preferred embodiment shown in the drawing is of the cylinder and piston type, and because of the space limitations encountered in an automobile, is mounted on the engine side of the firewall 16, and is designed to push the abutment surfaces of the reaction linkage A away from the servo-motor.

The servo-motor B shown in the drawing generally comprises a cup-shaped cylinder 46 provided with a removable end enclosure member 48 suitably gasketed and bolted in place and which in turn is bolted to the firewall 16 by a spacer member 50 and bolts 52. The cup-shaped cylinder 46 is provided with an internal piston 54 having a rearwardly extending (i. e., toward the operator) portion or projection 56 which extends through holes in the end closure member 48 and spacer member 50 to transmit force to the reaction linkage A. The projection 56 comprises a tubular member or sleeve 58 having a reduced diameter end portion 60 and shoulder 62 fitted into an annular boss 64 on the piston 54 and held in place by a tubular piston pin 66. The opposite end of the sleeve 58 positioned outside of the cylinder 46 is provided with a pair of abutment brackets 68 whose generally parallel leg portions 70 are provided with longitudinally extending slots 72 adapted to receive a pin 26 of the force transmitting lever 22 the brackets 68 being welded to the sleeve 58.

As previously indicated, the operation of the servo-motor B is controlled by valve structure C, which because the servo-motor is normally atmospheric submerged, admits vacuum from the manifold of the automobile engine to the rearwardly positioned opposed cylinder chamber 80 to cause the piston 54 to move rearwardly and thereby move the reaction linkages A. The valve structure C generally comprises a longitudinally extending valve chamber 82 as formed by the sleeve 58, annular boss 64, the movable atmospheric poppet or sleeve 84, and the forwardly extending tubular projection or sleeve 86 which is attached to the forward face of the piston 54 as by plates 88 and 90 and bolts 92. The movable atmospheric poppet or valve sleeve 84 is provided with a radially extending flange 94 on its rearwardly positioned end, the radially outer edges of which are guided by the internal surfaces of the piston 54. The rear face of the flange 94 is coated with a resilient material adapted to provide a seal with the annular atmospheric valve seat 98 carried by the piston 54. The forward end of the poppet 84 is connected to the forwardly extending sleeve 86 by a diaphragm 100, or other movable member adapted to form a seal therewith, and the composite atmospheric poppet structure is biased against the atmospheric valve seat 98 as by a coil spring 102. The longitudinally extending valve chamber 82 is divided into opposed valve chambers 106 and 108 by a movable valve closure member or vacuum poppet 104 positioned within the annular boss 64 and adapted to abut the resilient coating 96 and form a seal therewith. The vacuum poppet 104 is provided with a rearwardly extending projection or push rod 110 which extends through the sleeve 58 to a point outside of the servo-motor where it is provided with a contact button 112 adapted to be engaged by the ramp 18 of the foot pedal 10. The forward end of the longitudinally extending valve chamber 82 is closed off by a diaphragm 114 suitably affixed to the sleeve 86 and the rearwardly positioned end of the valve chamber 82 is closed off by a second diaphragm 116 suitably affixed to the sleeve 58 and the push rod 110. Vacuum from the manifold of the automobile is communicated to the forwardly positioned opposed valve chamber 106 as by the flexible connection 118, and the rearwardly positioned opposed valve chamber 108 communicates with the rearwardly positioned piston chamber 80 as by passageway 120. The forwardly positioned cylinder chamber 122 is always supplied with atmospheric pressure through hole 124 and filter material 126 suitably carried by the removable end plate 128 on the forward end of the servo-motor. The atmospheric pressure of cylinder chamber 122 is communicated with the atmospheric poppet 84 through passageway 130 in the piston 54 such that forward movement of the movable valve closure member 104 closes off vacuum communication between the opposed valve chambers 106 and 108 and thereafter opens the atmospheric poppet valve to communicate atmospheric pressure with the rearwardly positioned cylinder chamber 80.

As previously stated, it is an object of the present invention to provide a balanced valve structure which requires a desirable minimum of manual effort to operate. To this end a forwardly extending projection or member 132 is provided on the movable valve closure member 104 to operatively engage the forwardly positioned diaphragm 114 and transfer its reaction to the movable valve closure member 104. It will be seen, therefore, that both ends of the valve chamber 82 are subjected to atmospheric pressure and that by suitably sizing the diaphragms 114 and 116, equal and opposite forces can be transmitted to the movable valve closure member 104. By also making the effective area of the movable valve closure member 104, as determined by its seat 134, equal to the effective areas of diaphragm 114 and diaphragm 116, a valve structure is provided which is essentially balanced regardless of the pressure in the rearwardly positioned valve chamber 108.

Referring to Figure 2, it will be seen that the total force tending to move the push rod 110 to the right is developed by manifold vacuum to air differential on diaphragm 114. This is opposed by the differentials across valve member 104 and diaphragm 116. The differential across valve member 104 will always be manifold vacuum to a vacuum level intermediate atmospheric pressure and manifold vacuum, and the differential across diaphragm 116 will be that remaining between the same intermediate vacuum level and atmospheric pressure; such that the sum of the differential across member 104 and diaphragm 116 always equals that across diaphragm 114 regardless of the intermediate vacuum level.

In order for the valve closure member 104 to follow the movements of the foot pedal lever 10, it must be biased rearwardly against the ramp 18. This can be accomplished by slightly oversizing the diaphragm 114 such that its delivered force slightly exceeds the force delivered to the movable valve closure member 104 by the diaphragm 116. The amount of force required to move the movable valve closure member 104 is determined largely by the friction produced between the guide bearings 136 and 138 and the sleeve 58. One of the difficulties encountered in using the reaction provided by the diaphragm 114 to move the movable valve closure member 104, however, is that the frictional resistance of the valve closure member 104 is substantially constant, and the vacuum supplied through the manifold of the automobile can and does vary considerably. Since the servo-motor must be able to operate satisfactorily at low vacuums of, say approximately 10 inches of mercury, the diaphragm 114 would have to be sized large enough to overcome the static friction of the movable valve member at a differential pressure of approximately 10 inches of mercury. Were the diaphragm to be so sized, however, and the engine is developing its normal 20 inches or more of vacuum, the force delivered to the movable valve closure member 104 would be approximately twice that required to overcome its friction, and the balance of the force would be transmitted to the pedal lever 110. This would require that the pedal lever return spring 40 would have to be oversized and that additional force would be required by the operator to depress the pedal lever. To overcome this objection, applicants have made the effective area of diaphragm 114 only slightly larger than the effective areas of the vacuum poppet 104 and the diaphragm 116, and has provided a spring 140 positioned between the sleeve 58 and the rod 110 to bias the valve closure member 104 against the ramp 18. It will be seen that by such an arrangement the spring 140 will produce a substantially constant force adapted to substantially equal and overcome the static friction of the valve closure member to provide a valve structure which requires a practical minimum of manual effort to operate.

Because valve seat 98 must be made larger than valve seat 134 in order to provide free passage of air, the diaphragm 100 cannot be sized to completely balance the atmospheric poppet 84 under all conditions. If the effective area of diaphragm 100 is made equal to the area of seat 134, substantially no force will be exerted on member 104 when atmospheric pressure is in valve chamber 108. Under such conditions, however, spring 40 would have to be made strong enough to move poppet 84 from the atmospheric valve seat 98 when full vacuum is admitted to valve chamber 108.

On the other hand, if the effective area of diaphragm 100 is made equal to the area of seat 98 to provide balance to the atmospheric poppet when full vacuum is admitted to chamber 108, unbalance will occur when atmospheric pressure is admitted to chamber 108; and spring 102 would have to be made strong enough to hold the poppet 84 against seat 98 under this condition. With this arrangement, however, unbalance urging the sleeve against seat 98 is created, when vacuum is admitted to chamber 108, and spring 40 would have to be sized strong enough to overcome this unbalance.

In the preferred embodiment, diaphragm 100 is sized to provide an effective area intermediate that of seats 134 and 98, and spring 102 is sized to provide the additional force necessary to hold poppet 84 against seat 98. With such an arrangement spring 40 can be made smaller than would be required in either of the two previous arrangements to provide a valve structure requiring a practical minimum amount of manual effort to operate under any and all operating conditions.

The rotational movement of the force delivering lever 22 causes the abutment pin 26 to move in an arcuate path; and because the top and bottom sides of the slot 72 in the parallel leg portions 70 of the abutment brackets 68 engage the abutment pin 26, a rocking or tilting action of the piston 54 is produced. This rocking or tilting action of the piston 54 necessitates that a suitable vacuum seal structure 142 be provided which will accommodate the lateral movement of the sleeve 58 with respect to the removable end closure member 48 of the cylinder 46. Openings 144 and 146 are provided in the removable end cover plate 48 and spacer member 50, respectively, slightly larger than necessary to accommodate the lateral movement of the sleeve 58, and the external face of the removable end cover plate is provided with a rubber facing 148. A leather vacuum seal ring 150 of more or less commercial construction and comprising a metallic jacket 152 having a flat radially extending abutment face 154 adapted to abut and seal with the rubber facing 148 is positioned about the sleeve 58. The leather vacuum seal ring 150 is biased into sealing engagement with the rubber facing 148 by a spring 156 positioned between the spacer member 50 and a retainer ring 158 which in turn engages the vacuum seal ring. It will be seen, therefore, that the sealing structure just described is not only capable of accommodating lateral movement of the sleeve 58, but is capable of providing an efficient vacuum seal with respect to the rubber facing 148 throughout such movement.

As previously indicated, the pressure seal 160 around the periphery of the piston 54 is likewise adapted to accommodate the tilting or rocking movement of the piston previously described. The periphery of the outer plate-like portion of the piston 54 is arranged to provide appreciable clearance with respect to the side walls of the cylinder and an annular leather sealing strip 162 of L-shaped cross-section is fitted between the piston and the side walls of the cylinder and is held in place by a seal retaining washer 164 and machine screws 166. The forwardly extending leg portion of the leather sealing strip 162 is held in engagement with the side walls of the cylinder by wicking 168 and packing expander ring 170 which in turn are supported from the piston by the wicking retainer plate 172 and the machine screws 166. It will thus be seen that the expander ring 170 biases the leather seal against the side walls of the cylinder notwithstanding rocking movement of the piston relative to the side walls. The piston 54 is biased to its forward or retracted position by the conically-shaped coil spring 174, in which position the rubber stop washer 176 supported on the external portion of the sleeve 58 abuts the external face of the spacer member 50.

*Operation*

As seen in Figure 2 of the drawings, the piston 54 is shown in its retracted position and the movable valve closure member 104 is shown in its open or servo-motor energizing position. It will be clear that in the normal retracted position of the servo-motor, the piston 54 will be in the position shown, and the valve closure member 104 will be biased against the resilient coating 96 of the atmospheric poppet 84 to bias it away from the atmospheric valve seat 98. In this position, atmospheric pressure from the forward cylinder chamber 122 is communicated through the passageway 130, the now open atmospheric poppet, valve chamber 108, and passageway 120 to the rearwardly positioned cylinder chamber 80, thereby establishing the normal atmospheric submerged condition of the servo-motor. When the pedal lever 10 is depressed by the operator, the ramp 18 is moved rearwardly relative to the abutment pin 26 a distance not to exceed the limit as determined by the lost motion connection 34. This initial rearward movement of the ramp 18 permits the vacuum poppet 104 to be moved rearwardly of the atmospheric valve seat 98 thereby permitting the spring 102 to move the atmospheric poppet valve 84 against its seat 98 to close off atmospheric communication between the forward power cylinder chamber 122 and the rearwardly positioned power cylinder chamber 80. With the vacuum poppet 104 positioned rearwardly of the atmospheric seat 98, the resilient seating surface of the atmospheric poppet will also be held out of engagement with the vacuum poppet 104 to permit vacuum from the forward valve chamber 106 to be communicated with the rear valve chamber 108 to communicate vacuum with the rearwardly positioned cylinder chamber 80, and thus energizing the servo-motor. Differential pressure across the piston 54 now causes the piston to be moved rearwardly, forcing the abutment pin 26 of the force delivering lever 22 rearwardly to actuate the master cylinder 32. Rearward movement of the abutment pin 26 causes the pin 36 of the lost motion connection 34 to approximately center itself in the slot 38 and to simultaneously move the atmospheric valve seat 98 to a position opposite the valve seat of the vacuum poppet 104 to produce a lapped condition of the servo-motor's control valve. It will be seen that continued pedal depressing movement by the operator causes ramp 18 to continue to be moved rearwardly until the pin 36 is moved into the rear half of the slot 38 and the vacuum poppet 104 is moved off of its seat to further energize the servo-motor. If the operator chooses to hold the pedal lever in this new position, rearward movement of the piston 54 causes the atmospheric valve member 84 to abut the vacuum poppet 104 to again establish a lapped condition of the valve structure; and the control valve of the servo-motor, barring leaks, will be maintained in its lapped condition to maintain the force delivering lever 22 in a corresponding position. It will further be seen that if for some reason failure of the servo-motor occurs, as when, for example, the automobile's engine does not produce sufficient vacuum to operate the servo-motor, movement of the foot pedal lever 10 will cause the pin 36 of the lost motion connection 34 to abut the rearwardly positioned surface of the slot 38 and thereby actuate the force delivering lever 22, manually.

The reaction linkage A shown in the drawing is of the type adapted to provide "feel," i. e., a reaction to the foot pedal lever 10 which will apprise the operator of the amount of force being delivered by the servo-motor B. This is accomplished in the linkage shown in the drawing by pivotally connecting the force delivering lever 22 to the foot pedal lever 10 at a point spaced apart from the pivotal support of the foot pedal lever. As seen in Figure 1 of the drawings, force delivered by the servo-motor to the abutment pin 26 produces a moment about pin 24 which is transferred to the piston rod 30 by the force delivering lever 22. The opposing force of the master cylinder 32, coupled with the force exerted by the servo-motor B, is transferred to the foot pedal lever 10 by the pin 24 which is spaced a slight distance away from the foot pedal lever's pivotal support 12. This total rearwardly directed reactive force forces the pedal 20 against the foot of the operator by an amount inversely proportional to the distances which pin 24 and pedal 20 are spaced from the pivotal support 12.

When the operator desires to release the force applied to the braking system, the foot pedal lever 10 is permitted to retract an appropriate distance. Movement of the operator's foot permits the spring 40 to move the ramp 18 forwardly, thereby forcing the vacuum poppet 104 against the atmospheric poppet 84 and thereby causing the vacuum poppet 104 to lift the atmospheric poppet 84 from the atmospheric valve seat 98. This permits atmospheric pressure from the forward cylinder chamber 122 to be communicated with the rearwardly positioned cylinder chamber 80 to decrease the amount of vacuum held therein. The reaction produced by the master cylinder 32 in conjunction with the piston spring 174 forces the piston forwardly until the reaction from the master cylinder 32 decreases sufficiently to effect a balance with the force produced on the piston by the now reduced differential pressure. During this retractile movement, the pin 36 is moved from its approximately mid-position of the slot 38 into the rearward half of the slot 38. Upon the piston 54 reaching its new essentially balanced position, the atmospheric seat 98 will have been moved backwards relative to the vacuum poppet 104 until the atmospheric seat 98 is opposite the vacuum seat 134. In this position the vacuum seat 134 will again abut the movable atmospheric poppet 84 to again establish a lapped condition. Complete retraction of the pedal lever 10 by the operator, of course, will permit the vacuum poppet 104 to continue to abut the atmospheric poppet 84 and hold the atmospheric poppet 84 in its open position such that the piston 54 continues to retract until the rubber stop washer 176 again abuts the external face of the spacer member 50.

As previously stated, rearward movement of the piston 54 causes the abutment pin 26 to move in an arcuate path as determined by the pivotally supported lever 22. Because the parallel leg portions 70 of the abutment bracket 68 abut the top and bottom portions of the abutment pin 26, the arcuate movement of this pin causes the piston 54 to rock or tilt a predetermined amount when moved lengthwise of its cylinder. This rocking or tilting action causes the sleeve 58 to move laterally with respect to the end closure member 48 and spacer member 50. As previously indicated, holes 144 and 146, respectively, are made large enough to accommodate this movement and the leather vacuum seal ring 150 positioned on the sleeve 58 and held in abutment with the rubber facing 148 by the spring 156 is slid laterally upon the rubber facing 148 to maintain a seal therewith. A vacuum seal between the piston 54 and the side walls of cylinder 46 is also maintained during the rocking action of the piston by its pressure seal 160. The packing expander ring 170 flexes sufficiently during this rocking action to maintain the outstanding leg portions of the annular leather sealing strip 162 in engagement with the side walls of the cylinder.

It will be seen that the objects and the advantages enumerated, as well as others, have been achieved and that there has been provided a servo-motor and reaction linkage assembly which utilizes a practical minimum of the manually applied force for the operation of its control valve structure and movement of its control linkage, and which delivers a practical maximum amount of the manually applied force to its cooperating master cylinder. While the invention has been described as embodied in a servo-motor of the piston and cylinder type, it will be obvious that the same principles may be embodied in equivalent servo-motors as, for example, bellows type and diaphragm type arrangements, which servo-motors may be either of the puller or pusher type.

While the preferred embodiment of the invention has been described in considerable detail, we do not wish to be limited to the particular construction shown which may be varied within the scope of the invention and it is the intention to cover hereby all adaptations, modifications and arrangements thereof which come within the practice of those skilled in the art to which the invention relates.

We claim:

1. In combination with leverage comprising a manually operable lever and a force delivering lever having portions on each lever which move in the same direction, said portions each having an abutment surface thereon, a servo-motor positioned adjacent said abutment surfaces and comprising a housing having a movable wall provided with an abutment portion adapted to contact said abutment surface of said force delivering lever and move it in one direction, substantially balanced valve means carried by said movable wall and adapted to be regulated by a movable control portion adapted to be abutted by the abutment surface of said manually operable lever, said valve means being constructed and arranged such that movement of its control portion in said one direction causes said movable wall to be energized in said one direction, means biasing said valve means in said one direction, and spring means biasing said manually operable lever in the opposite direction against said valve means control portion.

2. In combination with leverage comprising a manually operable lever and a force delivering lever pivotally supported to provide portions on each lever which move in the same direction, said portions each having an abutment surface thereon, a servo-motor positioned adjacent said abutment surfaces and comprising, a housing having an internal movable wall provided with a tubular abutment portion extending through an external wall of said housing and adapted to contact said abutment surface of said force delivering lever and move it in one direction, said abutment surfaces of said tubular abutment portion and said force delivering lever having guide means adapted to restrain radial movement of said abutment surfaces relative to each other, substantially balanced valve means carried by said movable wall and having a control portion extending through said tubular abutment portion and adapted to be abutted by the abutment surface of said manually operable lever, said valve means being constructed and arranged such that movement in said one direction causes said movable wall to be energized in said one direction, sealing means slidingly engaging said tubular abutment portion and forming a seal therewith, said sealing means being positioned adjacent the portion of said housing through which said tubular abutment portion extends, said portion of said housing having a flat sealing surface surrounding said tubular abutment portion, said sealing means having a flat sealing surface for sealing engagement with said sealing surface of said housing, and means biasing said sealing means against said portion of said housing.

3. In combination with leverage comprising a manually operable lever and a force delivering lever pivotally supported to provide portions on each lever which move in the same direction, said portions each having an abutment surface thereon, a pneumatic servo-motor positioned adjacent said abutment surfaces and comprising, an enclosed power cylinder having an internal piston provided with a tubular abutment portion extending through one end wall of said cylinder abutment surface of said force delivering lever and move it in one direction, sealing means between said piston and said cylinder, said sealing means, piston and cylinder being constructed and arranged to permit a slight amount of angular movement of said piston relative to said cylinder, said abutment surfaces of said tubular abutment portion and said force delivering lever having guide means adapted to restrain radial movement of said abutment surfaces relative to each other, substantially balanced valve means carried by said piston and having a control portion extending through said tubular abutment portion and adapted to be abutted by the abutment surface of said manually operable lever, said valve means being constructed and arranged such that movement of its control portion in said one direction causes said piston to be energized in said one direction, sealing means slidingly engaging said tubular abutment portion and forming a pneumatic seal therewith, said sealing means being positioned adjacent the portion of said cylinder through which said tubular abutment portion projects, said portion of said cylinder having a flat sealing surface surrounding said tubular abutment portion, said sealing means having a flat sealing surface for sealing engagement with said sealing surface of said housing, and means biasing said sealing means against said portion of said housing.

4. In combination with leverage comprising a manually operable lever and a force delivering lever pivotally supported to provide portions of each lever which move in the same direction, said portions each having an abutment surface thereon, a pneumatic servo-motor positioned adjacent said abutment surfaces and comprising a housing having a movable wall provided with an abutment portion adapted to contact said abutment surface of said force delivering lever and move it in one direction, said movable wall having a valve chamber therein the opposite ends of which are closed off by opposed movable walls which exclude atmospheric pressure from said chamber, a valve seat in said chamber between said movable walls dividing said valve chamber into opposed chambers, a valve closure member in said chamber constructed and arranged to close off said valve seat, said valve closure member being operatively connected to said opposed movable walls to transfer opposing forces from said opposed movable walls to said valve closure member, said valve closure member and said opposed movable walls each having approximately the same effective area, means communicating a source of predetermined pressure to one of said opposed chambers, said valve seat and said valve closure member being constructed and arranged such that movement of the closure member in said one direction causes said generally predetermined pressure to be communicated to the other opposed chamber and to one side of said movable wall to cause said movable wall to move in said one direction, abutment means operatively connected to said valve closure member and adapted to abut said abutment surface of said manually operable lever, means biasing said valve closure member in said one direction, and means biasing said manually operable lever in the opposite direction.

5. In combination with leverage comprising a manually operable lever and a force delivering lever pivotally supported to provide portions on each lever which move in the same direction, said portions each having an abutment surface thereon, a pneumatic servo-motor positioned adjacent said abutment surfaces and comprising, a housing having an internal movable wall provided with a tubular abutment portion extending through an external wall of said housing and adapted to contact said abutment surface of said force delivering lever and move it in one direction, said abutment surfaces of said tubular abutment portion and said force delivering lever having guide means adapted to restrain radial movement of said abutment surfaces relative to each other, sealing means slidingly engaging said tubular abutment portion and forming a pneumatic seal therewith, said sealing means being positioned adjacent the portion of said housing through which said tubular abutment portion extends, said portion of said housing having a flat sealing surface surrounding said tubular abutment portion, said sealing means having a flat sealing surface for sealing engagement with said sealing surface of said housing, means biasing said sealing means against said portion of said housing, said movable wall also having a valve chamber therein the opposite ends of which are closed off by opposed movable walls which exclude atmospheric pressure from said chamber, a valve seat in said chamber between said movable walls dividing said valve chamber into opposed chambers, a valve closure member in said chamber constructed and arranged to close off said valve seat, said valve closure member being operatively connected to said opposed movable walls to transfer opposing forces from said opposed movable walls to said valve closure member, said valve closure member and said movable walls each having approximately the same effective area, means communicating a source of predetermined pressure to one of said opposed chambers, said valve seat and said valve closure member being constructed and arranged such that movement of the closure member in said one direction causes said predetermined pressure to be communicated to the other opposed chamber and to one side of said movable wall to cause said movable wall to move in said one direction, abutment means operatively connected to said valve closure member and adapted to abut said abutment surface of said manually operable lever, means biasing said valve closure member in said one direction, and means biasing said manually operable lever in the opposite direction.

6. In combination with leverage comprising a manually operable lever and a force delivering lever pivotally supported to provide portions on each lever which move in the same direction, said portions each having an abutment surface thereon, a pneumatic servo-motor positioned adjacent said abutment surfaces and comprising, an enclosed power cylinder having an internal piston provided wtih a tubular abutment portion extending through one end wall of said cylinder and adapted to contact said abutment surface of said force delivering lever and move it in a forward direction, sealing means between said piston and said cylinder, said sealing means, piston and cylinder being constructed and arranged to permit a slight amount of angular movement of said piston relative to said cylinder, said abutment surfaces of said tubular abutment portion and said force delivering lever having guide means adapted to restrain radial movement of said abutment surfaces relative to each other, said tubular abutment portion also having a valve chamber therein the opposite ends of which are closed off by opposed movable walls which exclude atmospheric pressure from said chamber, a valve seat in said chamber between said movable walls dividing said valve chamber into a forwardly positioned and a rearwardly positioned opposed chamber, a valve closure member in said forwardly positioned chamber constructed and arranged to close off said valve seat, said valve closure member being operatively connected to said opposed movable walls to transfer opposing forces from said opposed movable walls to said valve closure member, said valve closure member and said movable walls each having approximately the same effective area, means communicating a source of generally predetermined pressure to one of said opposed valve chambers, said other of said opposed valve chambers communicating with the one of said cylinder opposed chambers in which said predetermined pressure will cause said movable wall to move in a forwardly direction, abutment means operatively connected to said valve closure member and adapted to abut said abutment surface of said manually operable lever, spring means biasing said valve closure member in said forward direction, and means biasing said manually operable lever in the opposite direction.

7. A pneumatic servo-motor comprising a power chamber having a movable wall provided with a generally tubular projection extending through one end wall of said power chamber, said movable wall also having a valve chamber adjacent the end of said tubular projection, a valve seat in said valve chamber disposed generally normally to said tubular projection, a valve closure member constructed and arranged to seat upon said valve seat and having a projection extending through said tubular projection of said movable wall whereby it may be regulated from a position externally of the power chamber, and a movable member in sealing engagement with the side walls of said valve chamber and operatively connected to said valve closure member to counteract pressure forces across said valve closure member.

8. A fluid pressure servo-motor comprising a power chamber having a movable wall provided with a tubular projection extending through a rear end wall of said power chamber, said movable wall also having a valve chamber adjacent the end of said tubular projection, a valve seat in said valve chamber disposed generally normally to said tubular projection, a valve poppet constructed and arranged to seat upon said valve seat and positioned rearwardly of said seat, said valve poppet having a projection extending externally of said power chamber through said tubular projection of said movable wall, and a movable member in sealing engagement with the side walls of said valve chamber and operatively connected to said valve poppet to bias said poppet toward an open position.

9. A pneumatic servo-motor comprising a power chamber having a movable wall provided with a generally tubular projection extending through one end wall of said power chamber, said movable wall also having a valve chamber adjacent the end of said tubular projection, a valve seat in said valve chamber disposed generally normally to said tubular projection, a valve closure member constructed and arranged to seat upon said valve seat and having a projection extending through said tubular projection of said movable wall whereby it may be regulated from a position externally of the power chamber, a first movable member in sealing engagement with the side walls of said valve chamber and operatively connected to said valve closure member to transmit force thereto, and a second movable member connected to said projection of said valve closure member to transmit force thereto and sealingly engaging said tubular projection of said movable wall.

10. A pneumatic servo-motor comprising a power chamber having a movable wall provided with a generally tubular projection extending through one end wall of said power chamber, said movable wall also having a valve chamber adjacent the end of said tubular projection, a valve seat in said valve chamber disposed generally normally to said tubular projection, a valve closure member constructed and arranged to seat upon said valve seat and having a projection extending through said tubular projection of said movable wall whereby it may be regulated from a position externally of the power chamber, a first movable member in sealing engagement with the side walls of said valve chamber and operatively connected to said valve closure member to transmit force thereto, a second movable member connected to said projection of said valve closure member to transmit force thereto and sealingly engaging said tubular projection of said movable wall, and a spring biasing said valve closure member to an open position.

11. A pneumatic servo-motor comprising a power chamber having a movable wall provided with a generally tubular projection extending through one end wall of said power chamber, said movable wall also having a valve chamber adjacent the end of said tubular projection, a valve seat in said valve chamber disposed generally normally to said tubular projection, a valve closure member constructed and arranged to seat upon said valve seat and having a projection extending through said tubular projection of said movable wall whereby it may be regulated from a position externally of the power chamber, a first diaphragm in sealing engagement with the side walls of said valve chamber and operatively connected to said valve closure member, a second diaphragm connected between and sealingly engaging said tubular projection of said movable wall and said projection of said valve closure member, and a spring biasing said valve closure member to an open position.

12. In combination with reaction leverage comprising first and second levers pivotally connected at one point, and operatively connected at a spaced point by a lost motion connection adapted to permit limited relative rotation; a servo-motor substantially as described in claim 7 wherein the tubular projection of said movable wall abuts said first lever, and the projection of said valve poppet abuts said second lever; first spring means biasing said movable wall to a retracted position away from said levers; and second spring means biasing said second lever against said projection of said valve poppet.

13. In combination with reaction leverage comprising first and second levers pivotally connected at one point, and operatively connected at a spaced point by a lost motion connection adapted to permit limited relative rotation; a servo-motor substantially as described in claim 10 wherein the tubular projection of said movable wall abuts said first lever, and the projection of said valve poppet abuts said second lever; first spring means biasing said movable wall to a retracted position away from said levers; and second spring means biasing said second lever against said projection of said valve poppet, said second spring means being adapted to close said valve against its spring.

14. In a fluid pressure servo-motor for braking systems and the like, a control valve comprising a movable member having a valve chamber therein opposite ends of which are subjected to substantially the same pressure, first and second diaphragms closing off opposite ends of said valve chamber from said pressure, a valve seat in said chamber dividing said chamber into first and second opposed chambers adjacent said first and second diaphragms respectively, means providing a fluid conducting connection to said first opposed chamber and adapted to be connected to a second source of pressure, and a poppet valve constructed and arranged to abut said valve seat, said poppet valve having portions operatively connected to said opposed diaphragms for transferring force from said opposed diaphragms to said poppet valve, and the effective pressure subjected areas of said valve seat and said opposed diaphragms being such as to substantially balance said poppet valve under all pressure outputs of said valve.

References Cited in the file of this patent
UNITED STATES PATENTS

| | | |
|---|---|---|
| 1,237,980 | Webster | Aug. 21, 1917 |
| 2,457,721 | Price | Dec. 28, 1948 |
| 2,735,268 | Stelzer | Feb. 21, 1956 |
| 2,770,223 | Ayers et al. | Nov. 13, 1956 |